R. P. BROWN.
ANIMAL TRAP.
APPLICATION FILED FEB. 16, 1912.
1,028,538. Patented June 4, 1912.
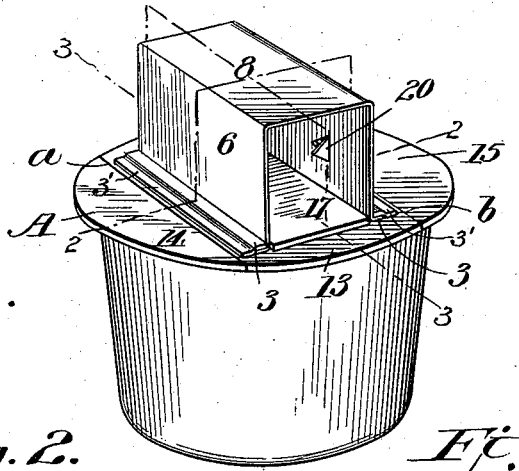
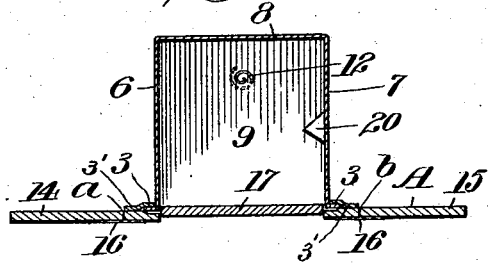
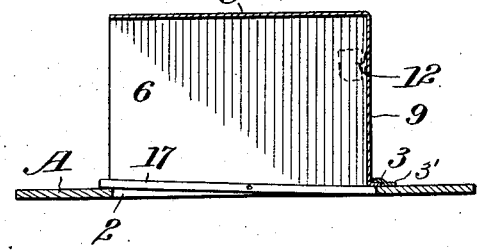
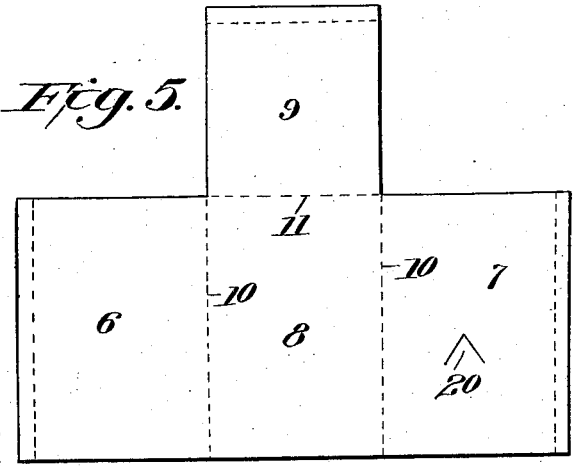
WITNESSES
INVENTOR
Robert P. Brown
By T. Walter Fowler, Attorney

UNITED STATES PATENT OFFICE.

ROBERT P. BROWN, OF WASHINGTON, DISTRICT OF COLUMBIA.

ANIMAL-TRAP.

1,028,538.  Specification of Letters Patent.  Patented June 4, 1912.

Application filed February 16, 1912. Serial No. 677,932.

*To all whom it may concern:*

Be it known that I, ROBERT P. BROWN, a citizen of the United States, residing at Washington, in the District of Columbia, have invented certain new and useful Improvements in Animal-Traps, of which the following is a specification.

This invention relates to certain new and useful improvements in animal-traps of the self-and-ever-set type; that is, the invention has special reference to animal traps in which a pivoted platform is employed and wherein the weight of the animal upon the platform overbalances the latter and results in the animal being deposited in a vessel underlying the trap, the said platform returning to normal position as soon as the weight of the animal is removed from it.

The object of the present invention is to provide an improved trap of the character described, and one which is of a knock-down nature and is of such construction that it may be folded into a small compass and may be sold in its knock-down form in a suitable envelop or wrapper containing directions or other subject-matter, and which trap may be quickly folded into operative form to enable it to be placed upon a pail or other vessel when employed as a receiver for the animals.

In its preferred form the trap is composed of paper such as cardboard or strawboard, said trap comprising two essential parts, namely, a foldable base, and a foldable hood-portion detachably mounted on the base.

In the accompanying drawings forming part of this specification and in which similar reference characters indicate like parts in the several views, Figure 1 is a perspective view of the animal-trap embodying my invention and showing the same in position upon a pail or receiver. Fig. 2 is a cross sectional view on the line 2—2 of Fig. 1. Fig. 3 is a longitudinal sectional view on the line 3—3 of Fig. 1. Fig. 4 is a view of the trap in its knock-down form. Fig. 5 is a view of a blank from which the hood-portion of the trap is formed.

In carrying out my invention I prefer to construct the trap of paper such as cardboard, strawboard, or the like, and of such dimensions as will readily adapt it for catching mice and small rodents, but it will be understood that the dimensions of the trap may be increased or diminished without altering the character of the invention. The base, A, may be given any desired configuration, but is preferred to be circular in design so as to readily adapt it for seating upon and as a closure for, the top of an open vessel such as a pail, but this vessel may be of any desired character, and it may serve as a container for water into which the animal will be dumped from the tilting platform hereinafter specified. The base, A, will be sufficiently thick to give it the necessary rigidity and in its center is formed a rectangular opening, 2, of substantial area; along the sides of this opening and along one end of the same, are formed in any suitable manner channels or grooves, 3, for securing in operative position the other or hood-portion of the trap.

In the drawings I have shown for illustrative purposes as one manner of securing the hood portion in operative position on the base, the placing of strips, 3', along the base and the employment of the detached inner edges of these strips as grooves into engagement with which the lower bent edges of the sides of the hood portion may be forced; but it will be understood that for the purpose of properly sustaining the hood portion in position I may employ any of the well known methods commonly employed in knock-down paper box construction for connecting one part to another, without departing from the spirit of my invention.

The hood-portion is formed of a single piece of material fashioned from a suitable blank of the character shown in Fig. 5, and which blank is cut to form the panels, 6, 7, 8 and 9, the blank being scored along the lines 10, to enable it to be folded so that the panels, 6 and 7, become the vertical sides of the hood when the blank is folded into the form shown in Fig. 1; the panel, 8, forms the top of the hood and the panel, 9, forms the rear end of the hood, said panel, 9, being bent along the scored line, 11, so that when it is folded inwardly it acts as a closure for the rear end of the hood and also as a means for attaching the bait to which the animal is attracted, said bait being attached to this back panel by any suitable means as for instance by the wire-holder, 12.

The lower edges of the panels or sides, 6, 7 and of the back panel, 9, are bent outwardly to form flanges along substantially their entire length, said flange being adapted for ready insertion in the grooves or channels, 3, formed along the walls of the opening, 2, in the top of the base member, whereby when the blank is folded in the manner described, the said flanges may be readily inserted in the grooves or channels and the hood portion thereby retained securely in an upright position ready for use; when the trap is not in use, the flanges of the sides and back panels may be readily disconnected or removed from the grooves or channels, and the hood-portion may be unfolded or collapsed and laid flat in its knock-down position upon the base portion, whereby the device may be placed upon a shelf or in any other location, and will require but a minimum of storage space.

In order that the device may occupy the least possible space, and, further, that it may be made as a paper-manufacture, and sold as an original package inclosed in a suitable envelop, the paper container bearing directions for assembling and such other data as may be of interest to the purchaser, I prefer that the base shall be formed of sections to render it also of a foldable or collapsible character. To this end the base is slitted along the lines, a, b, to form the sections, 13, 14 and 15, the main section, 13, being the one in which is made the opening for the platform and the outside sections 14 and 15, being appropriately hinged or joined to the main section along the longitudinal sides thereof, which hinging or joining may be done by means of a strip of cloth or other flexible material, 16, pasted or otherwise secured on the underside of the main and side sections and bridging the joint therebetween. This construction enables the base to be opened out so that its sections will lie in a horizontal plane, and form a suitable support for the hood section and a closure for the pail or vessel upon which the trap is seated; it also enables the side sections of the base to be folded under the main or intermediate section, whereby the dimensions of the base are so much reduced as to enable the base with its knock-down hood-portion to lie flat one on the other and to be placed within a suitable envelop and sold to the public in this condition.

The remaining element of the trap consists of the tilting platform, 17, which is centrally pivoted within the opening, 2, in the middle section, 13, of the base and which platform forms a tilting bottom for the hood-portion, said platform being very sensitive so that when the animal enters the platform in order to reach the bait, it must pass beyond the pivotal center of the platform whereby the weight of the animal will overbalance the platform and cause the rear end of the same to tip downwardly and thus deposit the animal in the pail or receptacle below. Upon the weight of the animal being removed from the platform, the latter returns to normal position by reason of its front end being slightly heavier than the rear end. Thus the trap is self-setting and is ever ready for its intended work. It is simple in its construction, inexpensive and efficient and yet like the more expensive metal traps of this character, is adapted to reset itself after each capture so that it will always be set for catching an animal.

To prevent the possible overthrow of the platform, and to insure its return to operative normal position, I provide on the inside of the side panels, suitable stops or projections which are arranged in the path of the upward swinging movement of the rear end of the platform. These stops may be of any suitable character and when the hood-portion is made of paper as hereinbefore described, one of the sides may be slitted and the slitted portion bent inwardly to form a tongue, 20, which acts as a stop for the purpose before described.

Having thus described my invention what I claim as new and desire to secure by Letters Patent is:—

1. A foldable trap of the character described, comprising a base member formed of jointed sections foldable flatwise one on the other, one of said sections being apertured, a tilting platform mounted within said aperture and forming a closure therefor, and a readily detachable collapsible hood-portion comprising foldably connected sides and a connecting top.

2. A foldable trap of the character described, comprising a base member formed of pointed sections foldable flatwise one on the other, one of said sections being apertured, a tilting platform mounted within said aperture and forming a closure therefor, and a readily detachable collapsible hood-portion comprising foldably connected sides, a connecting top and a foldably connected closed end.

3. A knock-down trap of the character described, comprising a base formed of jointed sections foldable flatwise one on the other, one of said sections having a centrally located aperture, and having grooves or channels adjacent the walls of said aperture, a tilting platform, and a foldable hood-portion fashioned from a single piece of material bent to form side panels, a connecting top and an end panel, said side and end panels being foldably connected to said top, and said side and end panels having their lower edges bent to form flanges adapted to detachably engage said grooves or channels.

4. A knock-down trap of the character described, composed of paper and consisting of a base member formed of a middle section and a section at each side thereof and hinged thereto so that it may be folded relatively to the main section, said main section having an opening through it, and a tilting platform mounted on the base and forming a closure for said opening; and a hood-portion formed of paper folded to form parallel sides, a connecting top and an end panel, said sides and end panel being foldably connected to the top, said sides and end panel having their lower edges provided with flanges adapted to detachably engage said grooves or channels, and a bait-holder fixed to the hood-portion, said hood-portion adapted to be unfolded and to lie flat upon the base.

In testimony whereof I affix my signature in presence of two witnesses.

ROBERT P. BROWN.

Witnesses:
T. W. FOWLER,
PHILIP V. LARNER.

Copies of this patent may be obtained for five cents each, by addressing the "Commissioner of Patents, Washington, D. C."

It is hereby certified that in Letters Patent No. 1,028,538, granted June 4, 1912, upon the application of Robert P. Brown, of Washington, District of Columbia, for an improvement in "Animal-Traps," an error appears in the printed specification requiring correction as follows: Page 2, line 103, for the word "pointed" read *jointed;* and that the said Letters Patent should be read with this correction therein that the same may conform to the record of the case in the Patent Office.

Signed and sealed this 2d day of July, A. D., 1912.

[SEAL.]

C. C. BILLINGS,
*Acting Commissioner of Patents.*